(12) United States Patent
Calise

(10) Patent No.: US 9,494,941 B2
(45) Date of Patent: Nov. 15, 2016

(54) METHOD OF GUIDANCE OF UNMANNED AERIAL VEHICLES

(75) Inventor: Anthony J. Calise, Collegeville, PA (US)

(73) Assignee: Luminati Aerospace LLC, Calverton, NY (US)

( * ) Notice: Subject to any disclaimer, the term of this patent is extended or adjusted under 35 U.S.C. 154(b) by 0 days.

(21) Appl. No.: 12/824,888

(22) Filed: Jun. 28, 2010

(65) Prior Publication Data

US 2010/0332066 A1   Dec. 30, 2010

Related U.S. Application Data

(60) Provisional application No. 61/220,772, filed on Jun. 26, 2009.

(51) Int. Cl.
*G01C 22/00* (2006.01)
*G05D 1/00* (2006.01)
*G05D 1/02* (2006.01)

(52) U.S. Cl.
CPC .................................. *G05D 1/0204* (2013.01)

(58) Field of Classification Search
CPC ...................................................... G05D 1/0204
USPC .......................................................... 701/23
See application file for complete search history.

(56) References Cited

U.S. PATENT DOCUMENTS

| | | | | |
|---|---|---|---|---|
| 2009/0125163 A1* | 5/2009 | Duggan | ............... | G05D 1/0061 701/2 |
| 2009/0157233 A1* | 6/2009 | Kokkeby | ............... | G01S 3/7864 701/3 |
| 2009/0187299 A1* | 7/2009 | Fregene | ............... | G05D 1/0094 701/23 |
| 2010/0084513 A1* | 4/2010 | Gariepy | ............... | B64C 39/024 244/190 |

* cited by examiner

*Primary Examiner* — Imran Mustafa
(74) *Attorney, Agent, or Firm* — Duane Morris LLP

(57) ABSTRACT

A method of guiding aerial vehicles to a target site in adverse weather conditions wherein the method regulates the range indirectly by regulating heading error to an offset target that revolves around the true target site. The improved guidance architecture is effective in adverse weather conditions, such as high winds.

2 Claims, 3 Drawing Sheets

US 9,494,941 B2

METHOD OF GUIDANCE OF UNMANNED AERIAL VEHICLES

CROSS-REFERENCE TO RELATED APPLICATIONS

This application claims priority to U.S. Provisional Patent Application Nos. 61/220,772 entitled "An Improved Method of Guidance of Unmanned Aerial Vehicles in Challenging Environmental Conditions" filed on Jun. 26, 2009, which is incorporated fully herein by reference.

TECHNICAL FIELD

The present invention relates to unmanned aerial vehicle guidance and more particularly, relates to a method of guiding aerial vehicles to a target site in adverse weather conditions.

BACKGROUND INFORMATION

The primary field of application for this invention is to guidance of unmanned aerial vehicles (UAVs). A common characteristic among unmanned aerial vehicles is that they are capable of flying at air speeds that are marginally greater than winds speeds that are commonly encountered when flying at a low altitude and/or close to the ground, or around nearby buildings when flown in an urban environment. In such situations, a critical issue is maintaining an intended maneuver (such as flying a precise turn or circling over a target site), flying through confined air space, or maintaining a formation with respect to another air vehicle (for purposes of collision avoidance).

Ideally a guidance system in such cases should be as robust as possible in its ability to reject the disturbing effects of winds and wind gusts using only GPS data. Presented herewith is a method for precise circling about a target site based on the concept of minimizing the relative degree of the output being regulated, which is an improvement over current guidance strategy. These concepts are generally applicable to other guidance objectives as well.

SUMMARY

The present invention features a method of guiding an aerial vehicle to an intended target site and for maintaining a circular path above an intended target site by the aerial vehicle, and for regulating range error to the target site by regulating heading error to an offset target site. The method comprises the acts of obtaining information relative to estimated horizontal distance between the aerial vehicle and the intended target site, and then calculating an instantaneous heading between a current position of the aerial vehicle and an offset target site thereby utilizing the calculated instantaneous heading between a current position of the aerial vehicle and an offset target site for guiding the aerial vehicle to the intended target site.

Also disclosed is a method of guiding aerial vehicles to a target site comprising the acts of calculating a desired heading error, $\delta\psi_d$, using a first equation $\delta\psi_d = V_h/R_d K_\psi$; calculating an angle $\theta$ using a second equation: $\theta = \pi/2 - \delta\psi_d$; calculating $\cos\phi$ using a third equation $\cos\phi = 1 - 2\cos^2\theta$; calculating an angle $\epsilon$ using a fourth equation $$\epsilon = \tan^{-1}\left(\frac{R_d \sin\phi}{R_e - R_d \cos\phi}\right);$$

and calculating a heading error relative to an offset target site ($\delta\psi$) by first calculating the heading error relative to a true target site and subtracting the calculated angle $\epsilon$.

BRIEF DESCRIPTION OF THE DRAWINGS

These and other features and advantages of the present invention will be better understood by reading the following detailed description, taken together with the drawings wherein.

DETAILED DESCRIPTION OF THE PREFERRED EMBODIMENTS

Figure 1:
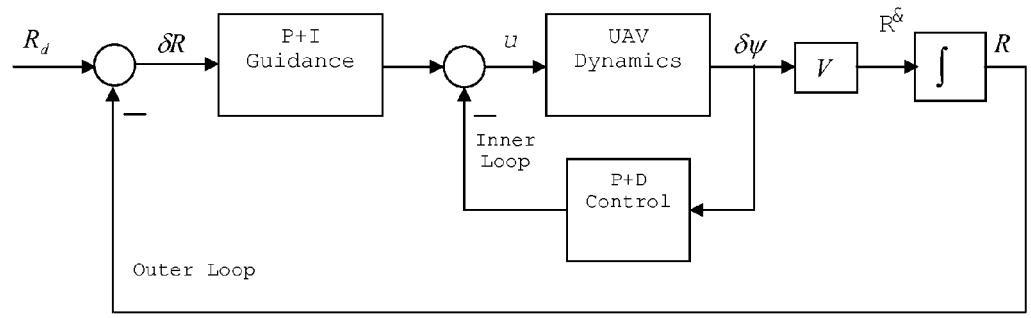
FIG. 1 is a block diagram of a conventional, prior art guidance architecture for regulating range to a fixed point.

One of the issues with regard to operating in a high wind environment concerns the ability to maintain a precise trajectory. An example is flying a precision circle at a desired range ($R_d$) over a target site. The classical approach to this problem, which is well known to those skilled in guidance system development, is to use a guidance architecture in which range error ($\delta R$) is regulated in the guidance law. A typical block diagram of such an architecture is depicted in FIG. 1 in which a proportional plus integral (P+I) guidance law is used to regulate the range error in the outer loop, and a proportional plus derivative (P+D) inner loop feedback control of heading error ($\delta\psi$) is used to improve the stability characteristics of the UAV. The heading error in this case is computed relative to a desired heading that is perpendicular to the line-of-sight (LOS) to the target.

Range error is more difficult to regulate than heading error because of its relative degree, which is the number of times it has to be differentiated with respect to time before the effect of the control variable (u) appears, is higher. It is apparent from FIG. 1 that the relative degree of range (R) is one greater than the relative degree of heading error since $\delta\psi$ is proportional to range rate and has to be integrated once to obtain R.

Figure 2:
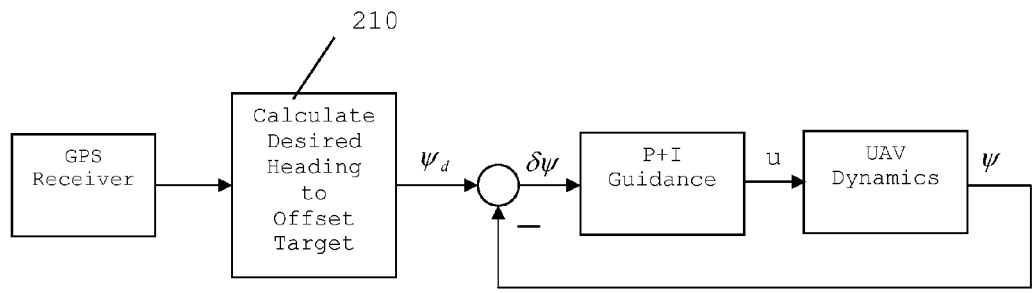
FIG. 2 is a block diagram of the guidance architecture of the present invention.

It is advantageous from a dynamics viewpoint to regulate range indirectly by regulating heading error to an offset target that revolves around the true target site. A typical block diagram illustrating this architecture is shown in FIG. 2.

In one embodiment of the invention, it would be preferable to calculate the desired heading to an offset target site. Circular motion about a target site can be achieved by guiding towards a point that is offset from the target in a direction that is perpendicular to the instantaneous LOS to the target site. As the target is approached, the offset point naturally begins to rotate about the target. One possibility is to choose a constant value for the offset. This is adequate in the absence of winds, but will typically result in distorted motions about the target site under high wind conditions. A better approach is to make the offset value a function of horizontal velocity, and choose it so that the turn rate commanded by the guidance law matches the turn rate needed to maintain the offset distance from the target site (maintain a circular trajectory) at the point where the flight direction first becomes perpendicular to the LOS. Assuming the guidance law commands a turn rate proportional to the heading error, then:

$$\dot{\psi}_{com} = K_{psi} * \delta\psi \quad (1)$$

where $\delta\psi$ is the heading error. It is desirable that the command turn rate match the turn rate needed to maintain a circular path around the target site when the velocity is tangent to that circle.

Figure 3:
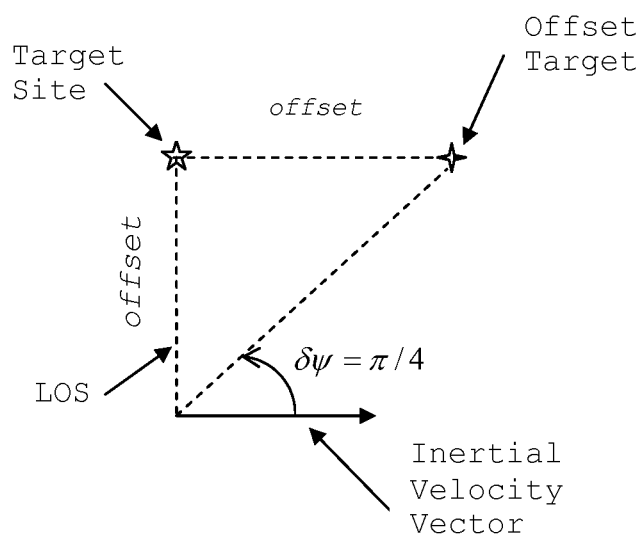
FIG. 3 details the geometry at the tangent point.

FIG. 3 shows that $\delta\psi = \pi/4$. The turn rate needed for circular motion is $V_h$/offset, where $V_h$ is the instantaneous horizontal velocity. Therefore, substituting $\pi/4$ for $\delta\psi$ in (1) and equating the result to $V_h$/offset, we obtain:

$$\text{offset} = V_h/(K_{psi} * \delta\psi) = 4V_h/\pi K_{psi} \quad (2)$$

While this guidance law does degenerate into a circular motion about the target site, it does not provide an independent means for regulating the radius of the circle.

Figure 4:
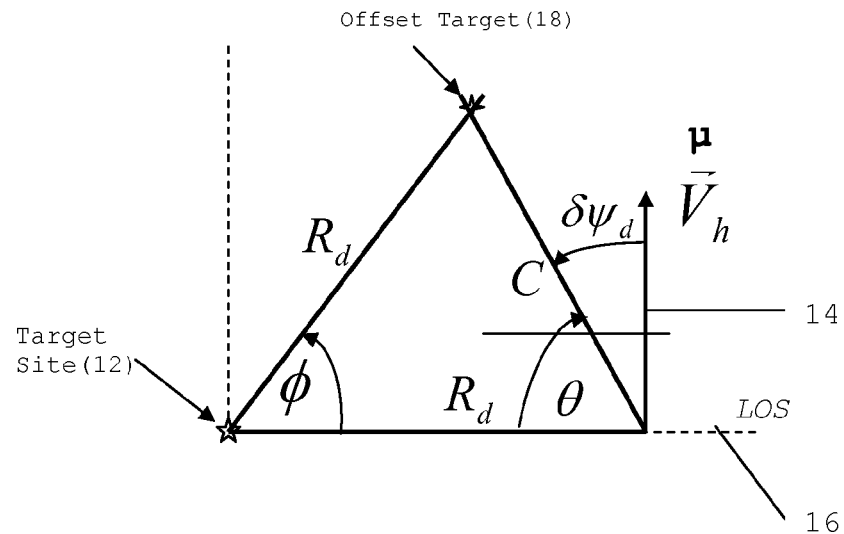
FIG. 4 details the geometry for an improved circling approach.

An alternate embodiment of the present invention is to command an offset equal to the desired range, and instead use the angle that the offset radius makes with the instantaneous LOS as the control variable. This is depicted as the angle $\theta$ in FIG. 4. FIG. 4 shows the aerial vehicle flying a circular path of desired radius $R_d$ about the target site 12, with its horizontal velocity 14 vector perpendicular to the LOS 16, and chasing the offset target 18 located at the same distance from the target site 12. The heading error ($\delta\psi_d$) relative to the desired heading C is also depicted. This is the heading error, which when multiplied by $K_{psi}$ (see Eq. (2)) results in a turn rate ($V_h/R_d$) consistent with maintaining a circular path. From FIG. 4 it can be seen that:

$$\theta = \pi/2 - \delta\psi_d \quad (3)$$

From the geometry it follows that:

$$C^2 = 2R_d^2(1 - \cos\phi) \quad (4)$$

and:

$$R_d^2 + C^2 - 2R_d C \cos\theta = R_d^2 \quad (5)$$

Using Eq. (4) to eliminate C in Eq. (5) we get:

$$\cos\phi = 1 - 2\cos^2\theta \quad (6)$$

as one of the main conditions required in order to maintain a circular path about the target site 12, regardless of the desired radius, $R_d$. Since Eq. (1) also has to be satisfied, then:

$$\dot{\psi}_c = K_{psi} * \delta\psi_d = V_h/R_d \quad (7)$$

Solving Eq. (7) for $\delta\psi_d$ we get:

$$\delta\psi_d = V_h/R_d K_\psi \quad (8)$$

as the second required condition.

Figure 5:
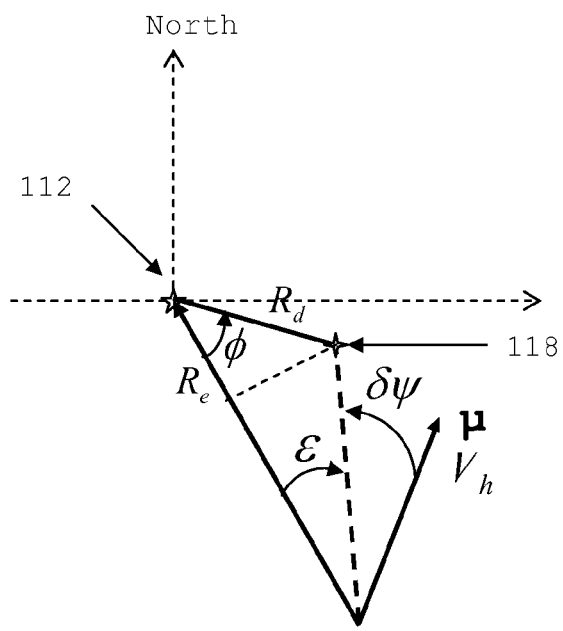
FIG. 5 details the geometry on the way to the target site.

FIG. 5 depicts the geometry that exists as the aerial vehicle is flying towards the target site area 112, prior to entering its spiraling turn. The GPS estimated horizontal distance to the target 112 is denoted $R_e$. The angle $\delta\psi$ is the heading error relative to the offset target site 118, whose offset angle satisfies Eq. (8). From this geometry the angle $\epsilon$ satisfies:

$$\epsilon = \tan^{-1}\left(\frac{R_d \sin\phi}{R_e - R_d \cos\phi}\right) \quad (9)$$

The sequence of calculations for the improved logic for spiraling into a circular path at a specified radius, $R_d$, is summarized by the following computational steps:

1. Calculate the desired heading error, $\delta\psi_d$, using Eq. (8).
2. Calculate the angle $\theta$ using Eq. (3).
3. Calculate $\cos\phi$ using Eq. (6)
4. Calculate the angle $\epsilon$ using Eq. (9).
5. Calculate the heading error relative to the offset target site 118 ($\delta\psi$ in FIG. 5) by first calculating the heading error relative to the true target site 112 and subtracting the angle $\epsilon$.

FIG. 5 is an illustration of how the guidance problem of regulating range error to a target site can be converted into an equivalent guidance problem of regulating heading error to an offset target. The equivalent problem is obtained by deriving a nonlinear transformation of desired range into an equivalent desired heading error as outlined in steps 1-5 above. This transformation is utilized to calculate the desired heading to offset target 210 as shown in FIG. 2. The resulting guidance architecture in FIG. 2 is a more robust approach to guidance under high wind conditions because the relative degree of heading error is one less than the relative degree of range error. In general, those familiar with the art of guidance law development should appreciate the fact that this same concept of transforming a guidance problem into an equivalent problem of regulating an error signal of lesser relative degree can be applied to other mission oriented guidance objectives such as flying through a narrow corridor or maintaining a fixed position relative to another UAV for purposes of formation flight. The ultimate goal should be to seek an equivalent guidance architecture that requires regulating of an error signal having minimum relative degree. This approach to guidance law development can be regarded as more natural (perhaps even biologically inspired) method for achieving precision maneuvering in high wind environments, because the lower the degree of the regulated output variable, the more accurately the guidance objective can be achieved under difficult environmental conditions such as those due to high winds.

Modifications and substitutions by one of ordinary skill in the art are considered to be within the scope of the present invention, which is not to be limited except by the following claims.

What is claimed is:

1. A method of guiding an aerial vehicle towards and entering a circular orbit of specified radius about a target site, the aerial vehicle including a control element configured and operable to control the aerial vehicle and a guidance element configured and operable to provide instructions to the control element to guide the aerial vehicle, the method comprising:

calculating a desired heading error, $\delta\psi_d$, using a first equation: $\delta\psi_d = V_h/R_d K_\phi$ in the guidance element;

calculating an angle $\theta$ between an instantaneous line of sight from the aerial vehicle to the target site and an offset radius using a second equation:

$$\theta = \frac{\pi}{2} - \delta\psi_d$$

in the guidance element;

calculating $\cos\Phi$ using a third equation: $\cos\Phi = 1 - 2\cos^2\theta$ in the guidance element;

calculating an angle $\epsilon$ using a fourth equation: $\epsilon = \tan^{-1}(R_d \sin\Phi/Re - R_d \cos\Phi)$ in the guidance element;

calculating a heading error relative to an offset target site $\delta\psi$ by first calculating heading error relative to a true target site and subtracting the calculated angle $\epsilon$ in the guidance element; and providing instructions to the control element based on the heading error to guide the aerial vehicle towards the offset target site.

2. A method of guiding a vehicle to an intended target site and entering into and maintaining a circular path about said intended target site by said vehicle, and for regulating range error to the target site by instead regulating heading error to an offset target site, the vehicle including a control element configured to control the vehicle and a guidance element configured and operable to provide instructions to the control element to guide the vehicle, said method comprising:

obtaining information relative to estimate horizontal distance between said vehicle and said intended target site in the guidance element; and calculating an instantaneous heading between a current position of said vehicle and the offset target site in the guidance element;

determining the position of the offset target site, that itself rotates about the intended target site in such a manner so that steering the vehicle towards the rotating offset target site results in a circular motion of the vehicle about the true target site at a specified radius in the guidance element;

utilizing said calculated instantaneous heading to generate instructions for guiding the vehicle toward the rotating offset target site; and providing the instructions to the control element to guide the vehicle toward the rotating offset target site.

* * * * *